United States Patent [19]
Malone et al.

[11] Patent Number: 5,328,710
[45] Date of Patent: Jul. 12, 1994

[54] READY TO SERVE FROZEN DESSERT FOR SOFT SERVE DISPENSING

[75] Inventors: Michael J. Malone; Joyce G. Sage, both of Houston, Tex.

[73] Assignee: The Coca-Cola Company, Atlanta, Ga.

[21] Appl. No.: 42,964

[22] Filed: Apr. 5, 1993

Related U.S. Application Data

[63] Continuation-in-part of Ser. No. 882,729, May 14, 1992, Pat. No. 5,256,436.

[51] Int. Cl.$^5$ .............................. A23G 9/02
[52] U.S. Cl. ........................ 426/565; 426/567; 426/583; 426/804
[58] Field of Search ............. 426/565, 566, 567, 583, 426/41, 43, 804

[56] References Cited

U.S. PATENT DOCUMENTS

| | | | |
|---|---|---|---|
| 4,110,476 | 8/1978 | Rhodes | 426/565 |
| 4,293,573 | 10/1981 | Bradley, Jr. et al. | 426/583 |
| 4,391,830 | 7/1983 | Gudnason et al. | 426/583 |
| 4,427,701 | 1/1984 | Morley | 426/565 |
| 4,430,349 | 2/1984 | Malone et al. | 426/583 |
| 4,452,824 | 6/1984 | Cole et al. | 426/565 |
| 4,518,581 | 5/1985 | Miyake et al. | 426/658 |
| 4,631,196 | 12/1986 | Zeller | 426/580 |
| 4,737,374 | 4/1988 | Huber et al. | 426/565 |
| 4,985,270 | 1/1991 | Singer et al. | 426/515 |
| 5,082,682 | 1/1992 | Peterson | 426/565 |
| 5,096,731 | 3/1992 | Singer et al. | 426/583 |
| 5,112,626 | 5/1992 | Huang et al. | 426/565 |
| 5,215,777 | 6/1993 | Asher et al. | 426/565 |
| 5,256,436 | 10/1993 | Malone et al. | 426/565 |

OTHER PUBLICATIONS

W. S. Arbuckle, *Ice Cream*, 3d ed., 1977 (AVI Publishing Co., Westport, Ct.), pp. 34–105, 323–331.

"The Solubility of Dextrose in Pure Water" *Bureau of Standards* (NITS) p.191.

Primary Examiner—Jeanette Hunter
Attorney, Agent, or Firm—Kenyon & Kenyon

[57] ABSTRACT

A soft serve frozen dessert, e.g., yogurt, ice milk, ice cream, capable of being hard packed and dispensed from an accordion-type cartridge is disclosed. The frozen dessert composition is formed with at least about 0.1 weight percent lecithin, at least about 0.15 weight percent pectin, and at least about 0.1 weight percent of a gum selected from the group consisting of xanthan gum and locust bean gum, wherein the composition has a lactose content according to the following formula:

$$((\Sigma IL)/C) \leq 9.0 \quad \text{(I)}$$

wherein
  $I$ = weight percentage of mix ingredient;
  $L$ = weight percentage lactose in that mix ingredient; and
  $C$ = weight percentage of free water in the mix, and wherein the composition has a dextrose content according to the following formula:

$$((\Sigma ID)/C) \leq 6.5 \quad \text{(II)}$$

wherein
  $I$ = weight percentage of mix ingredient;
  $D$ = weight percentage dextrose in that mix ingredient; and
  $C$ = weight percentage of free water in the mix, and wherein the composition has a molar solute concentration according to the following formula:

$$MC = -0.1514 T_{max} + 0.03027 T_{min} - 0.04177 F + 3.675 \quad \text{(III)}$$

wherein
  $MC$ = molar solute concentration (mol/weight percentage of free water);
  $T_{max}$ = maximum dispensing temperature (° F.);
  $T_{min}$ = minimum dispensing temperature (° F.); and
  $F$ = weight percentage of fat content of the mix.

20 Claims, No Drawings

READY TO SERVE FROZEN DESSERT FOR SOFT SERVE DISPENSING

This application is a continuation-in-part of copending application Ser. No. 07/882,729, filed May 14, 1992 now U.S. Pat. No. 5,256,436.

FIELD OF THE INVENTION

This invention relates to frozen dessert compositions, and more particularly to ready to serve frozen dessert compositions for soft serve dispensing.

BACKGROUND OF THE INVENTION

Frozen dessert compositions are known in the art. Soft serve frozen dessert compositions prepared in a traditional freezer/dispenser machine are introduced into the machine in the form of a mix. This mix is frozen to a semi-solid consistency and held in this condition until dispensed into cones or bowls to fill the consumer's order. When these desserts are dispensed, about 60% of the aqueous phase of the mix is frozen into ice. The ice that has formed exists as small crystals which do not grow to an undesirable size due to the relatively short duration in the dispenser and the constant scraping of a dasher on the freezing surface of the barrel in the freezer/dispenser. During freezing, air is incorporated into the semi-frozen mass to increase the volume of the original mix by about 30%. This expansion of volume is known as overrun.

Desserts prepared at the retail site use expensive freezer/dispenser equipment which requires not only substantial initial capital investment, but also extensive daily cleaning and maintenance. Daily cleaning of the equipment must be supported by skilled operators with sufficient facilities to disassemble the freezer and its dasher, clean and dry the numerous parts, and reassemble the freezer. High cost and maintenance requirements have thus relegated the availability of soft serve frozen desserts to specialty stores and fast food stores which have the capital and facilities to service the equipment.

Recently, dispensing machines such as one sold under the trade name "Supa Nova" by SaniServ, Indianapolis, Ind., have been developed which dispense factory frozen desserts via compression of a disposable collapsible cartridge. The factory frozen dessert is "hard packed" at a central factory, filled from a large commercial freezer, hardened and distributed to consumers, ready-to-serve through frozen distribution channels. Compression dispensers used with hard packed frozen desserts reduce capital costs because they reduce refrigeration and simplify the internal workings of the frozen dessert machine. Daily maintenance is reduced to cleaning of the dispensing nozzle which requires only a small sink or large bowl of cleaning solution. This system, with its simplicity as compared to machines required for the semi-solid mix forms of desserts, allows the sale of frozen desserts in outlets such as convenience stores or at salad bars in traditional restaurants.

One drawback to the collapsible cartridge system is in the sensory properties of the frozen dessert dispensed from collapsible cassettes. The "hard packed" frozen desserts needed to fill the collapsible cassettes are similar to standard ready-to-serve frozen desserts in that they are frozen in a central factory, hardened and delivered through a frozen distribution system used for ice cream. These "hard packed" desserts have about 90 to 100% of the aqueous phase in the form of ice. To prevent ice crystals from growing during frozen storage, high levels of stabilizing hydrocolloid are typically employed. These stabilizers increase the viscosity of the mix, which gives the product a desirable mouth coating effect. The lack of a liquid aqueous phase produces a somewhat dull surface appearance, rather than the sheen or wet appearance characteristic of soft serve frozen desserts.

The "hard packed" frozen desserts also differ from the soft serve desserts in that they tear or pull in a sticky mass resembling uncooked dough when spooned, unlike the soft serve products, which when cut leave a smooth, glossy surface.

The heaviness of the mouthfeel of the "hard packed" frozen desserts can be overcome to some extent by increasing the overrun to approximately 75 to 100%, thus diluting the concentration of mix in the finished product volume. Diluting the concentration produces a dessert which more closely resembles the melting, light body of soft serve frozen desserts, but often undesirably leads to a fluffy texture characteristic of a mousse or whipped topping. Accordingly, there is a need for a hard packed frozen dessert dispensable from a collapsible cartridge which possesses desirable sensory properties.

OBJECTS AND SUMMARY OF THE INVENTION

In light of the foregoing, it is therefore an object of the invention to provide frozen dessert compositions having desirable sensory properties. It is a further object of this invention to provide a frozen dessert having properties such as good appearance (high sheen), smooth mouthfeel, good taste, and ease of cutting with a spoon without "tearing."

It is a further object of the present invention to provide ready to serve frozen yogurt compositions for soft serve dispensing having acceptable properties such as good appearance (high sheen), smooth mouthfeel, good taste, and ease of cutting with a spoon without "tearing."

It is a further object of the present invention to provide ready to serve frozen dessert compositions for soft serve dispensing having acceptable storage properties and which are capable of being hard packed.

These and other objects of the invention are accomplished by producing a frozen dessert composition comprising at least about 0.1 weight percent lecithin, at least about 0.15 weight percent pectin, and at least about 0.1 weight percent of a gum selected from the group consisting of xanthan gum and locust bean gum, wherein the composition has a lactose content according to the following formula (I):

$$((\Sigma IL)/C) \leq 9.0 \qquad (I)$$

wherein

I = weight percentage of mix ingredient;
L = weight percentage lactose in that mix ingredient; and
C = weight percentage of free water in the mix, and wherein the composition has a dextrose content according to the following formula (II):

$$((\Sigma ID)/C) \leq 6.5 \qquad (II)$$

wherein

I = weight percentage of mix ingredient;
D = weight percentage dextrose in that mix ingredient; and
C = weight percentage of free water in the mix, and wherein the composition has a molar solute concentration according to the following formula (III):

$$MC = -0.1514 T_{max} + 0.03027 T_{min} - 0.04177 F + 3.675 \quad \text{(III)}$$

wherein

MC = molar solute concentration (mol/weight percentage of free water);
$T_{max}$ = maximum dispensing temperature (° F.);
$T_{min}$ = minimum dispensing temperature (° F.); and
F = weight percentage of fat content of the mix.

The frozen dessert composition of the invention can include at least about 0.1 weight percent lecithin, at least about 0.15 weight percent pectin, at least about 0.1 weight percent of a gum selected from the group consisting of xanthan gum and locust bean gum, at least about 0.12 weight percent albumin, about 40 to 70 weight percent skim milk, about 0.15 to 35 weight percent cream, about 3 to 5 weight percent nonfat dry milk, about 3 to 9 weight percent corn syrup solids, about 6 to 17 weight percent high fructose corn syrup, and about 0.3 to 0.5 weight percent flavors. Optionally, the composition can also include one or more of the following ingredients: about 2 weight percent reduced lactose nonfat dry milk; about 4 to 10 weight percent sugar; about 0.1 to 0.3 weight percent gelatin; and about 5 percent yogurt. The composition can also include bulky fruit bits if desired.

DESCRIPTION OF THE PREFERRED EMBODIMENTS

The frozen dessert compositions of the invention provide good appearance (high sheen), smooth mouthfeel, good taste, and ease of cutting with a spoon without "tearing." The compositions are capable of being hard packed at a central factory and of being dispensed in a collapsible cartridge container. The dessert compositions of the invention have at least about 0.1 weight percent lecithin, at least about 0.15 weight percent pectin, at least about 0.1 weight percent of a gum selected from the group consisting of xanthan gum and locust bean gum, and at least about 0.12 weight percent albumin. The compositions of the invention also have less than about 9.0 weight percent lactose in an aqueous phase of the mix, and less than about 6.5 weight percent dextrose in the aqueous portion of the mix. In a preferred embodiment of the invention, the compositions also contain about 40 to 70 weight percent skim milk, about 0.15 to 35 weight percent cream, about 3 to 5 weight percent nonfat dry milk, about 3 to 9 weight percent corn syrup solids, about 6 to 17 weight percent high fructose corn syrup, and about 0.3 to 0.5 weight percent flavors. Optionally, the composition can also include one or more of the following ingredients: about 2 weight percent reduced lactose nonfat dry milk; about 4 to 10 weight percent sugar; about 0.1 to 0.3 weight percent gelatin; and about 5 percent yogurt.

The total solids content of the composition preferably is about 28 to 39%, with about 31.5 to 34.5% particularly preferred. The milk fat content preferably is about 0.1 to 12%, with about 0.25% particularly preferred. The milk solids nonfat content of the frozen dessert preferably is about 10 to 20%, with about 13.0% particularly preferred.

When the dessert composition is a yogurt, approximately about 0.66 weight percent lactic acid (10%) can also be included as a substitute for yogurt acid. It is preferred that about 5 weight percent yogurt be included in the composition when the dessert is a chocolate or vanilla yogurt. When the dessert is a fruit-flavored yogurt, the yogurt content preferably is as high as about 10 weight percent. When the dessert composition is a non-yogurt composition, it is preferred that no additional acid be added to the composition.

It has been found that two significant defects in compositions can be ice pellet formation and lactose crystallization, also referred to as sandiness. These defects can be accelerated by vibration of the dispenser when a freezer compressor or air compressor is cycled to the on position. While not wishing to be bound by theory, it is believed that the formation of ice pellets is seeded by dextrose crystals which can be formed when excessive levels of high fructose corn syrup are present. It is further believed that lactose crystallization, or sandiness, can result from lactose levels in excess of its solubility limit. In order to counteract these adverse properties of the compositions of the invention, the lactose content of the composition should be kept less than about 9.0 weight percent of the aqueous phase of the mix. The dextrose content of the composition should be kept at less than about 6.5 weight percent of the aqueous phase of the mix. These mix levels can be expressed by the following formulas (I) and (II):

$$((\Sigma IL)/C) \leq 9.0 \quad \text{(I)}$$

wherein

I = weight percentage of mix ingredient
L = weight percentage lactose in that mix ingredient
C = weight percentage of free water in the mix $$((\Sigma ID)/C) \leq 6.5$$

where in

I = weight percentage of mix ingredient
D = weight percentage dextrose in that mix ingredient
C = weight percentage of free water in the mix Use herein of the term weight percentage of free water in the mix refers to 100 minus weight percentage of total solids minus water bound with or made unavailable by the solids.

Adherence to these mix levels of dextrose and lactose can minimize the development of ice pellets and sandiness, and also prolong the shelf life of the composition in its dispenser and tempering cabinet to as much as twice as long as when these mix levels are not attained.

When the mix levels set by formulas (I) and (II) above are followed, the freezing point depression of the mix, and therefore the hardness of the product, can be affected. Therefore, it is desirable to account for the freezing point depression of the mix to provide a product whose dispensability will be acceptable. In the most preferred embodiment of the invention, the composition contains a molar concentration of soluble components in the aqueous phase of the mix established by the following formula:

$$MC = -0.1514 T_{max} + 0.03027 T_{min} - 0.04177 F + 3.675 \quad \text{(III)}$$

wherein
- MC = molar solute concentration (mol/weight percentage of free water)
- $T_{max}$ = maximum dispensing temperature (° F.)
- $T_{min}$ = minimum dispensing temperature (° F.)
- F = weight percentage of fat content of the mix The molar solute concentration preferably is between about 0.38 and about 2.35 for frozen desserts of the invention. The molar solute concentration should be calculated as the sum of the mole weights of the truly soluble fractions of the ingredients in the aqueous phase of the mix. That is, the molar solute concentration is the sum of the mole weights of the sugars, acids, and salts (if any) present in the mix, and expressed as a concentration in the water. The sugars included in the molar solute concentration include the lactose present in the milk components of the composition, as well as any sugars present in sweeteners or bulking agents. The acids included in the molar solute concentration calculation include those contributed by the yogurt, as well as any acids added by, for example, added citric acid in sherbet formulations. Salts included in the molar solute concentration calculation include any citrates, phosphates, or the like which are indigenous to the milk components or which are added to the mix. Proteins, lipids, hydrocolloids, and other colloidal or dispersed molecules are not included in the calculation according to formula (III) above, since they are not considered to be truly dissolved, and therefore are not considered true solutes. Accounting for the fat content in formula (III) provides a formulation having a more predictable and acceptable plasticity than where fat content is not considered in calculating the molar solute concentration.

In compositions of the invention, albumin from egg white preferably is present in an amount of from about 0.12 to 1.2 weight percent, with about 0.72 to 0.84 weight percent particularly preferred. Dry egg white is approximately 80 weight percent albumin. Therefore, the preferred range of egg white is 0.15 to 1.5 weight percent, with about 0.90 to 1.2 weight percent particularly preferred. Optionally, whey albumin can be substituted for egg albumin.

It is preferred that the pectin used in compositions of the invention be casein reactive, in order to stabilize heavy milk used in the composition. While a variety of casein reactive pectins may be suitable with the invention, high methoxyl pectins are particularly preferred. A preferred pectin is one sold under the trade name "Hercules JMJ" by Hercules Corporation, Del.

The lecithin preferably is a soy lecithin, a lecithin sold under the trade name Actiflo 68 UB, from Central Soya, being particularly preferred.

The preferred composition ranges of lecithin, pectin and gum are about 0.1 to 0.3 weight percent lecithin, about 0.15 to 0.7 weight percent pectin, and about 0.1 to 0.5 weight percent xanthan gum or locust bean gum. It has been found that a composition with less than about 0.1 weight percent lecithin, about 0.15 weight percent pectin, and about 0.1 weight percent gum exhibits undesirable properties such as decreased sheen, increased tearing, formation of larger-sized ice crystals, and increased popping during dispensing and air cell formation.

It has been found that usage of xanthan gum or locust bean gum increases the sheen of the frozen dessert product, decreases the "tearing" of the product when cut with a spoon, and enhances control of the growth of ice crystals in the product during storage. Locust bean gum is particularly preferred. It is believed that lecithin acts as a surfactant in the present composition to reduce the size of air cells in the frozen dessert product. Air cells in the frozen dessert product contribute to a popping sound when the product is dispensed and, if too large, give the product a mousse-like texture which is uncharacteristic of soft serve products. It is further believed that pectin contributes to the composition's desirable glossy sheen, and serves to prevent separation of the mix, particularly at the factory.

It has been found that increasing the lecithin, pectin and gum levels above about 0.3 weight percent lecithin, about 0.7 weight percent pectin, or about 0.5 weight percent xanthan or locust bean gum, while not adversely affecting the properties of the composition, does not appear to significantly improve the properties of the frozen dessert. It is therefore preferred to maintain below about 0.3 weight percent lecithin, about 0.7 weight percent pectin, and about 0.5 weight percent gum in the composition.

The preferred corn syrup solids useful with the present invention are "regular conversion" corn syrup solids (38-48DE), with 36DE corn syrup solids particularly preferred. A particularly preferred high fructose corn syrup is high fructose corn syrup (71° B) (42% fructose). Flavors useful in compositions of the invention can be chosen from any conventional flavors used in frozen dessert compositions, or any other suitable flavor.

Either whey albumin or egg whites may be used. It is believed that the albumin present in the composition of the invention, whether in the form of egg whites or whey albumin, contributes to the desirable smoothness of the frozen dessert product when cut with a spoon. Also, polysorbates can be used in place of lecithin. However, while both xanthan gum and locust bean gum have been found to be acceptable in compositions of the invention, it is believed that guar gum, microcrystalline cellulose and carboxymethyl cellulose, which are gums typically used in frozen dessert compositions, are less effective with compositions of the invention than xanthan gum or locust bean gum.

A particularly preferred yogurt embodiment of the invention comprises the following ingredients in the stated weight percentages:

| Ingredient | Weight % |
| --- | --- |
| Yogurt | 5.00 |
| Skim milk | 66.68 |
| Cream | 0.22 |
| Nonfat dry milk | 3.47 |
| 36DE Corn syrup solids | 5.58 |
| High fructose corn syrup (71° B) | 6.76 |
| Pectin | 0.40 |
| Lecithin | 0.20 |
| Locust bean gum | 0.25 |
| Powdered egg white | 1.20 |
| Flavor | 0.44 |
| Sugar | 9.80 |

The total solids content of this composition preferably is about 32%, the milk fat content preferably is about 0.25%, and the milk solids nonfat content of the frozen dessert preferably is about 10.0%. The milk fat content can be as high as about 2% in the event a lowfat composition is desired. The acid content of the composition, expressed as weight percent lactic acid, is about 0.23%. The lactose concentration is about 8.093 weight percent, the dextrose concentration is about 4.02 weight percent, and the molar solute concentration is about 1.206.

A second particularly preferred yogurt embodiment of the invention comprises the following ingredients in the stated weight percentages:

| Ingredient | Weight % |
| --- | --- |
| Yogurt | 5.00 |
| Skim milk | 66.77 |
| Cream | 0.22 |
| Nonfat dry milk | 3.46 |
| 36DE Corn syrup solids | 5.58 |
| High fructose corn syrup (71° B) | 6.48 |
| Pectin | 0.40 |
| Lecithin | 0.20 |
| Locust bean gum | 0.25 |
| Powdered egg white | 1.20 |
| Flavor | 0.44 |
| Sugar | 9.80 |
| Gelatin | 0.20 |

The total solids content of this composition preferably is about 32%, the milk fat content preferably is about 0.25%, and the milk solids nonfat content of the frozen dessert preferably is about 10.0%. The milk fat content can be as high as about 2% in the event a lowfat composition is desired. The acid content of the composition, expressed as weight percent lactic acid, is about 0.23%. The lactose concentration is about 8.09 weight percent, the dextrose concentration is about 3.87 weight percent, and the molar solute concentration is about 1.189.

A particularly preferred ice milk embodiment of the invention comprises the following ingredients in the stated weight percentages:

| Ingredient | Weight % |
| --- | --- |
| Skim milk | 64.91 |
| Cream | 1.28 |
| Nonfat dry milk | 4.78 |
| 36DE Corn syrup solids | 4.12 |
| High fructose corn syrup (71° B) | 8.37 |
| Pectin | 0.40 |
| Lecithin | 0.20 |
| Locust bean gum | 0.25 |
| Powdered egg white | 1.20 |
| Flavor | 0.44 |
| Sugar | 4.64 |

The total solids content of this composition preferably is about 31.4%, the milk fat content preferably is about 4.0%, and the milk solids nonfat content of the frozen dessert preferably is about 11%. The lactose concentration is about 8.82 weight percent, the dextrose concentration is about 4.69 weight percent, and the molar solute concentration is about 1.05.

A particularly preferred ice cream embodiment of the invention comprises the following ingredients in the stated weight percentages:

| Ingredient | Weight % |
| --- | --- |
| Skim milk | 44.75 |
| Cream | 33.02 |
| Nonfat dry milk | 4.37 |
| 36DE Corn syrup solids | 3.70 |
| High fructose corn syrup (71° B) | 7.50 |
| Pectin | 0.40 |
| Lecithin | 0.20 |
| Locust bean gum | 0.25 |
| Powdered egg white | 1.20 |
| Flavor | 0.44 |
| Sugar | 4.16 |

The total solids content of this composition preferably is about 36.9%, the milk fat content preferably is about 12.0%, and the milk solids nonfat content of the frozen dessert preferably is about 10%. The lactose concentration is about 8.72 weight percent, the dextrose concentration is about 4.57 weight percent, and the molar solute concentration is about 1.027.

Compositions of the invention can be dispensed from a collapsible accordion-type frozen dessert dispenser, and can be "hard packed" at a central factory while possessing desirable properties such as good appearance (high sheen), smooth mouthfeel, good taste, and ease of cutting with a spoon without "tearing." By varying the milk fat content and the milk solids nonfat content, the dessert compositions of the invention may comprise yogurt, ice cream, ice milk, or any other frozen dessert product. It is particularly preferred to utilize compositions of the invention to make soft serve frozen yogurts. According to the present invention, non-fat and low-fat soft serve frozen yogurts can be manufactured, in addition to full-fat yogurts, and can be hard packed and served in a collapsible accordion-type dispenser.

A mix of a composition of the invention is prepared as follows. A blend tank is filled with milk, cream, high fructose corn syrup and most of the skim milk to be included in the product. The dry ingredients, such as corn syrup solids, nonfat dry milk, pectin, dry egg whites, gum, sugar, and gelatin, are mixed into the liquid in such a manner to ensure that the dry materials are substantially fully hydrated without lumping. Lecithin preferably is then added to the mix, and the balance of skim milk not previously included is added to achieve the final mix volume.

The above mixture is warmed, preferably to a temperature of about 130° to 140° F., and homogenized. Homogenization preferably occurs in a two-stage homogenizer, with a pressure of about 2500 psig in the first stage and a pressure of about 500 psig in the second stage preferred. The homogenized mix is then pasteurized according to FDA requirements of 175° F. for 25 seconds or 150° F. for 30 minutes. The mix preferably is then cooled to less than about 40° F., and then held for at least several hours until ready for freezing. The preferred holding time is about 12 to 15 hours.

When the dessert composition is a yogurt composition, the yogurt is preferably prepared as follows. Skim milk and nonfat dry milk are mixed to achieve a milk solids nonfat content of about 10 to 13 percent. This mixture is then pasteurized to at least about 161° F. for at least about 15 seconds. The pasteurized mixture is pumped into a fermentation vessel and heated to about 185° F. for about 15 minutes and allowed to cool to about 115° F. The cooled mixture is inoculated with yogurt culture, including *S. thermophilous* and *L. bulgaricus*. The inoculated mixture is held in a closed fermentation vessel until the lactic acid content of the mixture reaches about 1 weight percent. The yogurt is then broken by turning on an agitator in the vessel and cooled to a temperature below about 45° F. to stop the fermentation. The yogurt is held until needed for addition to the mix just prior to freezing.

The final yogurt product is obtained by pumping a mix prepared as described above into a flavor tank. Flavorings and yogurt are then preferably added to the mix in total quantities of about 0.2 to about 12 weight percent of the total product, and stirred until homogeneous. The flavored mix preferably is pumped through a continuous freezer. Alternatively, the flavored mix can be pumped to a batch freezer. The mix is rapidly frozen to a semifrozen state under continuous agitation to provide a product with about 80 to 150 percent overrun as it exits the freezer. The exit temperature of the semifrozen mix preferably is about 20° to 22° F.

The semifrozen mix can, if desired, be passed through a fruit feeder to incorporate fruit, candy, or other desired particulate matter. The particles added preferably average less than about ⅜ inch in diameter. The product is ready for packaging, such as in a collapsible container. The packaged product can be quickly hardened by blast freezing to a temperature of about 31° F.

The hardened product is distributed, such as in the normal channels for ice cream to a hard freezer (kept at less than about 0° F.) at the point of dispensing. The dispenser can remove the container from the hard freezer and place it in a tempering cabinet, maintained at about 13° to 15° F. about 24 hours prior to dispensing. The product is loaded into the dispenser and dispensed on demand.

It is to be understood that the claims appended hereto are intended to cover all changes and modifications of the disclosure herein which do not depart from the scope of the invention.

What is claimed is:

1. A frozen dessert composition comprising at least about 0.1 weight percent lecithin, at least about 0.15 weight percent pectin, and at least about 0.1 weight percent of a gum selected from the group consisting of xanthan gum and locust bean gum, wherein the composition has a lactose content according to the following formula (I):

$$((\Sigma IL)/C) \leq 9.0 \quad (I)$$

wherein
I = weight percentage of mix ingredient;
L = weight percentage lactose in that mix ingredient; and
C = weight percentage of free water in the mix, and wherein the composition has a dextrose content according to the following formula (II):

$$((\Sigma ID)/C) \leq 6.5 \quad (II)$$

wherein
I = weight percentage of mix ingredient;
D = weight percentage dextrose in that mix ingredient; and
C = weight percentage of free water in the mix, and wherein the composition has a molar solute concentration according to the following formula (III):

$$MC = -0.1514 T_{max} + 0.03027 T_{min} - 0.04177 F + 3.675 \quad (III)$$

wherein
MC = molar solute concentration (mol/weight percentage of free water);
$T_{max}$ = maximum dispensing temperature (° F.);
$T_{min}$ = minimum dispensing temperature (° F.); and
F = weight percentage of fat content of the mix.

2. A composition according to claim 1 wherein the molar solute concentration is from about 0.38 to about 2.35.

3. A composition according to claim 2 wherein said lecithin is present in an amount of from about 0.1 to 0.3 weight percent.

4. A composition according to claim 2 wherein said pectin is present in an amount of from about 0.15 to 0.7 weight percent.

5. A composition according to claim 4 wherein said pectin a casein reactive pectin.

6. A composition according to claim 2 wherein said gum is present in an amount of from about 0.2 to 0.5 weight percent.

7. A frozen dessert composition comprising at least about 0.1 weight percent lecithin, at least about 0.15 weight percent pectin, at least about 0.1 weight percent of a gum selected from the group consisting of xanthan gum and locust bean gum, at least about 0.12 weight percent albumin, about 40 to 70 weight percent skim milk, about 0.15 to 35 weight percent cream, about 3 to 5 weight percent nonfat dry milk, about 3 to 9 weight percent corn syrup solids, about 6 to 17 weight percent high fructose corn syrup, and about 0.3 to 0.5 weight percent flavors.

8. A composition according to claim 7 further comprising about 2 weight percent reduced lactose nonfat dry milk.

9. A composition according to claim 7 further comprising about 4 to 10 weight percent sugar.

10. A composition according to claim 9 further comprising about 5 percent yogurt.

11. A composition according to claim 10 further comprising about 0.1 to 0.3 weight percent gelatin.

12. A composition according to claim 7 wherein the total solids content of the composition is about 28 to 39%, the milk fat content is about 0.1 to 12%, and the milk solids nonfat content is about 10 to 20%.

13. A hard packed, soft serve frozen yogurt composition comprising about 5 weight percent yogurt, about 66.68 weight percent skim milk, about 0.22 weight percent cream, about 3.47 weight percent nonfat dry milk, about 5.58 weight percent corn syrup solids, about 6.76 weight percent high fructose corn syrup, about 0.40 weight percent pectin, about 0.20 weight percent lecithin, about 0.25 weight percent locust bean gum, about 1.20 weight percent powdered egg white, about 0.44 weight percent flavor, and about 9.80 weight percent sugar.

14. A composition according to claim 13 wherein the total solids content is about 32%, the milk fat content is about 0.25%, and the milk solids nonfat content is about 10.0%.

15. A hard packed, soft serve frozen yogurt composition comprising about 5 weight percent yogurt, about 66.77 weight percent skim milk, about 0.22 weight percent cream, about 3.46 weight percent nonfat dry milk, about 5.58 weight percent corn syrup solids, about 6.48 weight percent high fructose corn syrup, about 0.40 weight percent pectin, about 0.20 weight percent lecithin, about 0.25 weight percent locust bean gum, about 1.20 weight percent powdered egg white, about 0.44 weight percent flavor, about 9.80 weight percent sugar, and about 0.20 weight percent gelatin.

16. A composition according to claim 15 wherein the total solids content is about 32%, the milk fat content is about 0.25%, and the milk solids nonfat content is about 10.0%.

17. A hard packed, soft serve frozen ice milk composition comprising about 64.91 weight percent skim milk, about 1.28 weight percent cream, about 4.78 weight percent nonfat dry milk, about 4.12 weight percent corn syrup solids, about 8.37 weight percent high fructose corn syrup, about 0.40 weight percent pectin, about 0.20 weight percent lecithin, about 0.25 weight percent locust bean gum, about 1.20 weight percent powdered egg white, about 0.44 weight percent flavor, and about 4.64 weight percent sugar.

18. A composition according to claim 17 wherein the total solids content of the composition is about 31.4%, the milk fat content is about 4.0%, and the milk solids nonfat content is about 11%.

19. A hard packed, soft serve frozen ice cream composition comprising about 44.75 weight percent skim milk, about 33.02 weight percent cream, about 4.37 weight percent nonfat dry milk, about 3.70 weight percent corn syrup solids, about 7.50 weight percent high fructose corn syrup, about 0.40 weight percent pectin, about 0.20 weight percent lecithin, about 0.25 weight percent locust bean gum, about 1.20 weight percent powdered egg white, about 0.44 weight percent flavor, and about 4.16 weight percent sugar.

20. A composition according to claim 19 wherein the total solids content is about 36.9%, the milk fat content is about 12.0%, and the milk solids nonfat content is about 10%.

* * * * *

UNITED STATES PATENT AND TRADEMARK OFFICE
CERTIFICATE OF CORRECTION

PATENT NO. : 5,328,710
DATED : July 12, 1994
INVENTOR(S) : Michael J. Malone et al.

It is certified that error appears in the above-identified patent and that said Letters Patent is hereby corrected as shown below:

In column 9, line 19, delete "31°" and insert -- -20° -- therefor.

Signed and Sealed this

Ninth Day of May, 1995

Attest:

BRUCE LEHMAN

*Attesting Officer*  *Commissioner of Patents and Trademarks*